Feb. 19, 1957  H. E. JOHNSON ET AL  2,781,679
STRAIGHTENING TOOL FOR UPPER CONTROL ARM
Filed Dec. 30, 1953
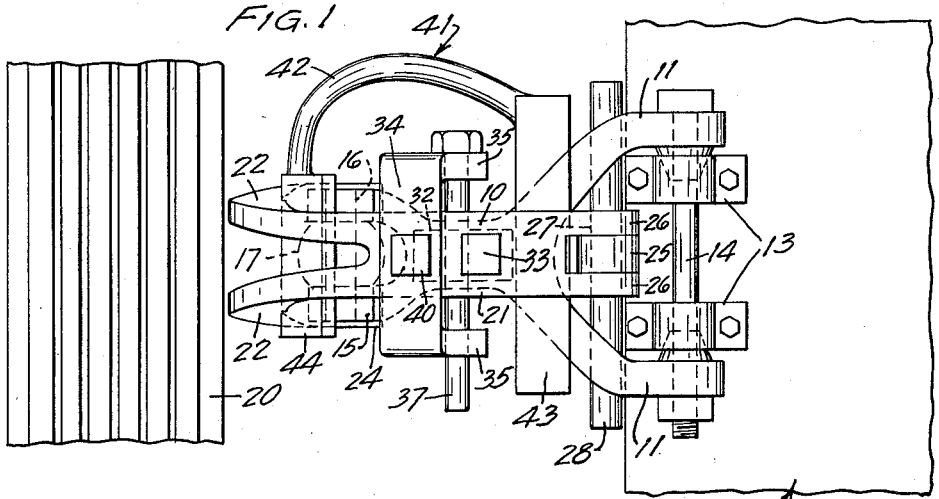
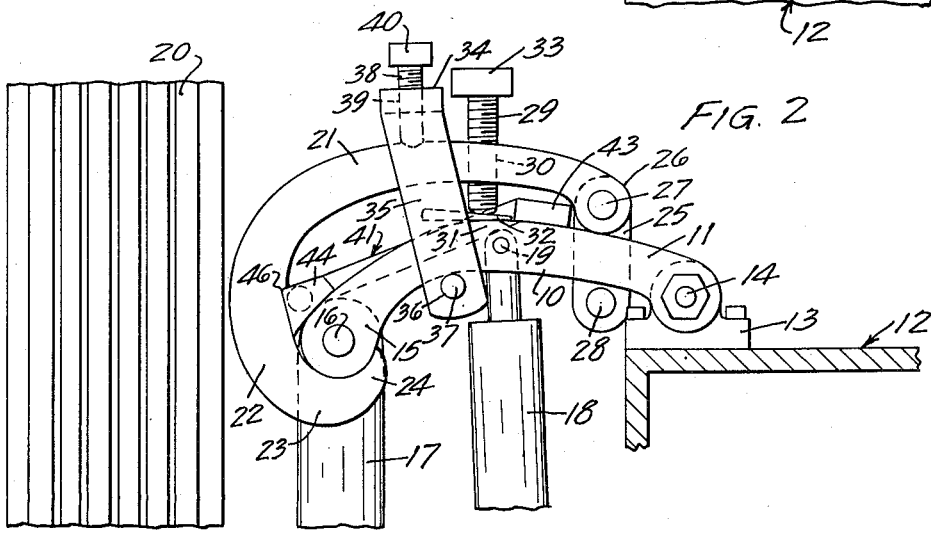
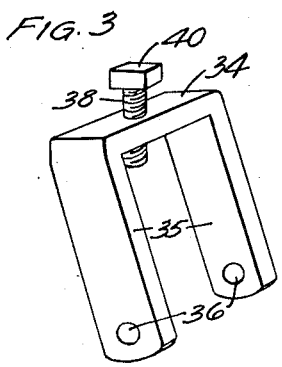
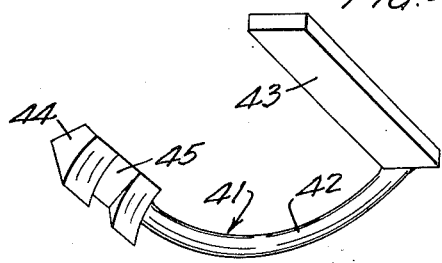
INVENTORS
HENRY E. JOHNSON
CARL M. HATLE
BY Williamson, Williamson, Schroeder & Adams
ATTORNEYS

United States Patent Office 2,781,679
Patented Feb. 19, 1957

2,781,679

STRAIGHTENING TOOL FOR UPPER CONTROL ARM

Henry E. Johnson, Webster, and Carl M. Haile, Roslyn, S. Dak.

Application December 30, 1953, Serial No. 401,349

2 Claims. (Cl. 81—15)

This invention relates to an auto mechanic's tool and more particularly to a device for straightening the upper control arms of an automobile wheel suspension assembly which have become unintentionally bent.

This application is a continuation-in-part of our copending application, Serial No. 380,553, filed September 16, 1953, the general purpose and mode of securing at a particular position with respect to an automobile upper control arm being similar in both instances. In the conventional front wheel suspension of a number of present day automobiles the wheel spindle is secured to an upper and a lower control arm. In many of these types of wheel suspensions a shock absorber is secured to the underside of the upper control arm and exerts considerable pressure thereon, especially when the automobile strikes holes or objects lying in the road. Even under lesser shocks, over a period of time, the upper control arm becomes bent at its medial portion, thus throwing the associated front wheel out of alignment. The king-pin assembly of such automobiles is provided with an eccentric bushing which will adjust camber, or deviation from the vertical, of the front wheel. The amount of eccentric adjustment is sufficient under normal circumstances to place the wheel at the proper position with respect to camber. Now, however, if the upper control arm has become bent, the upper end of the king-pin assembly will be pulled inwardly, thus causing the wheel to slant toward the framework of the car at its upper periphery. When this condition has been so exaggerated that the eccentric bushing can no longer compensate for it, then it becomes necessary to actually bend portions of the wheel assembly by force. The common method heretofore employed is to apply an expensive and cumbersome machine having a pressure of at least ten tons per square inch which will bend the spindle arms to a position which will compensate for the bent upper arm. Such procedure is obviously unsatisfactory because it involves bending a previously correct portion of the wheel assembly in order to compensate for another portion which has been unintentionally bent. The present invention contemplates straightening the upper control arm regardless of the direction in which it has been unintentionally bent. In some makes of automobiles the type of suspension is such as to encourage bending of the arm in either direction, depending upon the type of stress which is applied thereto.

It is, therefore, an important object of this invention to overcome the above noted difficulties and to provide a device which is economical and simple in structure which will compensate for the misalignment of a wheel assembly caused by the bending of the upper control arm, by straightening the bent element itself.

It is another object of the invention to provide a tool for straightening upper control arms which is adapted to interfit with the parts comprising the wheel suspension without the necessity of removing the upper control arm from the automobile.

It is a further object of the invention to provide an upper control arm straightener which has a bending force member capable of applying force either to the top of the control arm or to the underside thereof depending on which direction the upper control arm has become unintentionally bent.

It is a still further object of the invention to provide an extremely simple and convenient tool which can interfit in close relation with an upper control arm, utilizing the limited space available to quickly and easily straighten the arm and restore the wheel assembly to its original alignment.

These and other objects and advantages of our invention will more fully appear from the following description made in connection with the accompanying drawings wherein like reference characters refer to similar parts throughout the several views and in which:

Fig. 1 is a top view of our upper control arm straightener in operative position overlying a bent arm and utilizing a depending extension having a transverse abutment pin in contact with the bifurcated legs of the upper control arm, unessential details of the automobile having been eliminated from the view;

Fig. 2 is a side view of the straightener device shown in Fig. 1, the framework of the automobile being shown in vertical section and other unessential portions cut away;

Fig. 3 is a perspective view of that portion of the bearing means constituting a pulling member; and Fig. 4 is a perspective view of the auxiliary wedge block member separated from its operative position as shown in Fig. 2.

Referring now to the drawing, and particularly to Figs. 1 and 2, it is contemplated that our device be employed to straighten the upper control arms of an automobile front wheel suspension assembly, each control arm being of the type having a medial portion in the form of shank 10 terminating at its inner end in bifurcated legs 11 which in turn are pivotally mounted to the automobile framework 12 by such means as bearings 13 and pin 14. The shank of the upper control arm has a pivotal connection at its outer end such as knuckle joint 15 attached by pin 16 to the king-pin assembly 17. The knuckle joint is formed so as to lie at each side of the king-pin assembly 17. A shock absorber 18 is generally secured through a pivotal connection 19 to a medial point on the shank 10 of the control arm. It is often the action of the shock absorber 18 which will cause the upper control arm to become bent either upwardly or downwardly. The relationship of the wheel to the assembly is shown by the diagrammatic representation of a tire segment at 20.

Our invention lies in the device shown in Figs. 1 and 2, the device being an automobile mechanic's tool constructed more strongly than the upper control arm and preferably of steel. The device has a body portion 21 which is preferably elongated and adapted to be positioned in the same direction and in moderately close clearance with the medial surface of the control arm 10. The body portion 21 has an end for lying in bearing contact with the upper control arm, preferably in the form of a pair of bifurcated gripping members 22 each of which extends downwardly at 23, then reversely at 24 to provide hook-like elements for engaging the undersurface of the knuckle elements 15 at each side of the kingpin assembly 17.

In spaced relation with the gripping members 22 and at the opposite end of our device is another bearing contact with the upper control arm, including a depending extension 25 which is adapted to pass downwardly between the bifurcated legs or yoke 11 of the upper control arm as shown in Figs. 1 and 2. The depending extension is preferably mounted in a pivot connection formed by a clevis-type arrangement 26 having a removable pivot pin 27 extending through the upper end of the depending extension 25. The lower end of the extension bears an abutment member 28 which is adapted to engage the upper control arm so that force may be applied thereby in an upward direction by means of the tool.

Actuating bearing means are mounted medially of the elongated body and interconnect at a medial position with said control arm so that upon extending or retracting the bearing means, the unintentionally bent control arm may be again bent by actuation thereof into substantially its original and proper configuration, regardless of whether the arm has been unintentionally bent in an upward direction or in a downward direction. The actuating or bearing means comprises a first bearing member such as the threaded rod 29 which is medially mounted upon the body portion 21 of the tool and is disposed for lateral movement upwardly and downwardly as shown. We prefer a simple threaded engagement between the threaded rod 29 and a tapped opening 30 formed through the body 21 for alignment with the bent area 31 of the upper control arm 10 as shown in Fig. 2. A wedge block 32 may be supplied for providing a good bearing surface between the bearing member 29 and the bent area 31 of the control arm. The bearing member 29 may be provided with a head 33 adapted to engage with such conventional tool as a socket wrench.

A second bearing member may also be provided medially of the elongated body 21 to interconnect medially the upper control arm 10 and the elongated body 21. This second bearing member may comprise a U-bar 34 which may be positioned in encircling relation with both the upper control arm 10 and the elongated body of tool 21 as shown in Fig. 2. The U-bar member 34 is shown in perspective in Fig. 3, the depending legs 35 having at their outer extremities respective aligned holes 36. The aligned holes 36 are adapted to receive an abutment pin or rod 37 as shown in Figs. 1 and 2. A portion 38 of the second bearing member is provided for relative extension and retraction, preferably in the form of a threaded rod which is in threaded engagement with the opening 39 formed through the upper portion of U-bar 34. As in the case of the threaded rod 29, the rod portion 38 may have a squared head 40 which is adapted to be turned by an ordinary wrench.

In order to provide a bearing surface to be interposed between the upper control arm 10 and the tool 21 to the side of the medial spaced area, we prefer a removable bearing piece such as the auxiliary wedge block member 41 shown in perspective in Fig. 4 and in operating position in Fig. 2. The auxiliary wedge block member 41 has a side arm connection 42 which is rigidly attached to the bar or block 43 at one end and to the block 44 at the other end. A notched area 45 may be formed in the block 44 so as to accommodate a central portion of the knuckle joint 15 which requires clearance in some makes of automobiles. The auxiliary wedge block member 41 is adapted to be positioned as shown in Figs. 1 and 2, when the second bearing means is operatively employed to re-bend the upper control arm cam into its original shape. In order to prevent slippage of the auxiliary wedge block member 41, we may supply an abutment notch 46 formed through the inside surface of the tool and at one end thereof so as to be engageable by one of the blocks or bars of the auxiliary wedge block member.

In the use and operation of our device, we preferably remove the wheel from the assembly, having elevated the front end of the automobile by such means as crank or jack. When it is desired to bend the medial portion of upper control arm 10 downwardly, the first bearing member is retracted to allow the gripping or hook members to pass over the outer pivotal joint of the upper control member and to overlie the joint in pressing engagement. The depending extension 25 is then pivotally secured to the clevis 26 by means of removable pivot pin 27. The abutment 28 is then placed in engagement with the upper control arm 10. The first bearing member is then advanced toward the upper surface of the upper control arm 10 in the area of the unintentional bend so as to tightly engage with the upper surface thereof. The first bearing member is then further advanced so as to apply strain to the arm and cause it to bend correctively until the original form of the arm has been attained. The first bearing member is then retracted, the abutment members removed and the device taken off the wheel assembly. The wheel may then be replaced if it has been removed and the eccentric bushing of the kingpin assembly can again be reactivated so as to provide the appropriate adjustment for camber in the wheel assembly.

When it is desired to bend the medial portion of the upper control arm 10 in an upward direction, the auxiliary wedge block member 41 is positioned in the space between the tool and the upper control arm to the side of the medial area thereof as shown in Fig. 2 with the block 44 positioned in the abutment notch 46 formed at the inside surface of the tool member. The first bearing member will have its threaded portion 29 withdrawn so as to leave sufficient clearance to bend the control arm upwardly. Pressure is then applied to the second bearing member by turning the threaded rod member 38 and applying convergent forces between the outer surface of the tool device and the control arm as shown in Fig. 2. As in the first instance further advancing of the threaded rod 38 will cause the upper control arm to bend correctively until substantially the original form of the arm has been attained.

It will be noted that bearing member which is not in use during the corrective bending operation may be pre-set so as to supply a stop gauge to signify when the proper amount of corrective bending has been attained. Thus either of the bearing members may be applied with the bending device to an identical upper control arm which has not been unintentionally bent and the exposed extension of the bearing member can be measured or the number of visible threads can be counted with the bearing member drawn up in snug fit with the upper control arm. The same setting may then be duplicated with the device applied to an unintentionally bent upper control arm while the other bearing member is utilized to effect the corrective bending. When the control arm has been bent to the snug fit which characterized the unbent control arm with the pre-set bearing member acting as a stop gauge, then it will be determined that proper correction has been achieved. It may thus be seen that we have devised a compact, simple and inexpensive tool which can correct the misalignment of a front wheel assembly caused by unintentional bending of the upper control arm, the device being mounted in a unique manner to interfit with the close clearances available and correcting the misalignment at the proper place rather than compensating for misalignment by bending the spindle mounting or otherwise ignoring the true source of trouble.

It will, of course, be understood that various changes may be made in the form, details, arrangement and proportions of the parts without departing from the scope of our invention.

What we claim is:

1. An auto mechanic's tool for straightening, in a wheel suspension, an unintentionally bent upper control arm of the type joined pivotally at one end to a king-pin journal and at the other end joined pivotally to the framework of an automotive vehicle, said tool comprising, an elongated body of substantially stronger construction than said control arm and adapted to positioning with the control arm in the same general longitudinal direction, the medial portion of said elongated body then being in spaced relation with the medial portion of the control arm, the ends of said body converging toward the pivotally joined ends of the upper control arm and having bearing portions for applying substantially vertical force upon the underside of the upper control arm adjacent the pivotally joined ends thereof, bending mechanism having a first and a second member mounted medially of said elongated body, each member being shiftable in a general vertical direction opposite to the vertical direction of force exerted by each of said bearing portions to establish compressive contact with a medial position on said control arm, said first member being shiftably extensible for pushing simultaneously on the top side of the bent area of the upper control arm and on a medial portion of the structurally stronger elongated body, and said second member being shiftably retractable for bearing simultaneously on the underside of the upper control arm at a reversely bent area and on the top side of a medial portion of the structurally stronger elongated body for pulling the reversely bent control arm toward the elongated body, whereby said tool may be appropriately extended or retracted to bring said upper control arm, by corrective bending, substantially into its original proper configuration.

2. The subject matter of claim 1, and a removable bearing piece for interposition in the space between said bent upper control arm and the elongated body for establishing vertical bearing contact between areas adjacent the respective ends thereof, said bearing piece having a laterally bent medial portion adapted to operably clear the medially mounted bending mechanism.

References Cited in the file of this patent
UNITED STATES PATENTS

| | | |
|---|---|---|
| 186,229 | Casterline | Jan. 16, 1877 |
| 902,716 | Cross | Nov. 3, 1908 |
| 916,747 | Martin | Mar. 3, 1909 |
| 1,822,407 | Kennedy | Sept. 8, 1931 |